(12) United States Patent
Pauchet et al.

(10) Patent No.: US 12,270,477 B2
(45) Date of Patent: Apr. 8, 2025

(54) NEEDLE FOR A CHOKE VALVE ASSEMBLY

(71) Applicant: Schlumberger Technology Corporation, Sugar Land, TX (US)

(72) Inventors: Frederic Pauchet, Clamart (FR); Edmund Peter McHugh, Longford (IE); J. Daniel Belnap, Lindon, UT (US); Cheng Peng, Orem, UT (US); David Wahlquist, Spanish Fork, UT (US); Lynn Belnap, Spanish Fork, UT (US); Ivan Tapia, Provo, UT (US); Scott S. Dahlgren, Alpine, UT (US); Neil Cannon, Woodland Hills, UT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/262,768

(22) PCT Filed: Jan. 19, 2022

(86) PCT No.: PCT/US2022/070249
§ 371 (c)(1),
(2) Date: Jul. 25, 2023

(87) PCT Pub. No.: WO2022/159946
PCT Pub. Date: Jul. 28, 2022

(65) Prior Publication Data
US 2024/0418269 A1 Dec. 19, 2024

Related U.S. Application Data

(60) Provisional application No. 63/141,325, filed on Jan. 25, 2021.

(51) Int. Cl.
*F16K 1/48* (2006.01)
*F16K 1/38* (2006.01)
(Continued)

(52) U.S. Cl.
CPC .................. *F16K 1/54* (2013.01); *F16K 1/38* (2013.01); *F16K 1/487* (2013.01); *F16K 25/00* (2013.01); *F16K 25/005* (2013.01)

(58) Field of Classification Search
CPC ... F16K 1/48; F16K 1/487; F16K 1/54; F16K 25/00; F16K 25/005
See application file for complete search history.

(56) References Cited

U.S. PATENT DOCUMENTS 376,981 A * 1/1888 Frisbie .................... F16K 1/487
251/88
8,109,330 B1 * 2/2012 Miller .................. E21B 21/106
166/97.1
(Continued)

FOREIGN PATENT DOCUMENTS

| CN | 201787094 | 4/2011 |
|---|---|---|
| CN | 209294548 U | 8/2019 |
| JP | 2010121735 A | 6/2010 |

OTHER PUBLICATIONS

International Preliminary Report on Patentability issued in International Patent application PCT/US2022/070249 dated Aug. 3, 2023, 7 pages.
(Continued)

*Primary Examiner* — Kevin F Murphy
(74) *Attorney, Agent, or Firm* — Jeffrey D. Frantz

(57) ABSTRACT

A needle for a choke valve assembly includes a base portion formed from a first non-superhard material and a tip portion formed from a superhard material. The needle also includes a brazed connection coupling the tip portion to the base portion. The brazed connection includes an insert formed from a second non-superhard material, in which the second non-superhard material is harder than the first non-superhard material and softer than the superhard material. In addition, the brazed connection includes a shim disposed between the (Continued)

insert and the base portion, a first layer of brazing material disposed between the base portion and the shim, and a second layer of brazing material disposed between the shim and the insert.

12 Claims, 5 Drawing Sheets

(51) Int. Cl.
*F16K 1/54* (2006.01)
*F16K 25/00* (2006.01)

(56) References Cited

U.S. PATENT DOCUMENTS

| | | |
|---|---|---|
| 10,281,052 B2* | 5/2019 | Xiao ..................... F16K 1/487 |
| 10,619,746 B2* | 4/2020 | Kubota ................... F16K 1/48 |
| 10,830,359 B2 | 11/2020 | Miller |
| 2009/0146096 A1 | 6/2009 | Davies, Jr. |
| 2017/0343119 A1 | 11/2017 | Evans |
| 2019/0032792 A1 | 1/2019 | Miller |

OTHER PUBLICATIONS

International Search Report and Written Opinion issued in International Patent application PCT/US2022/070249 on Apr. 29, 2022, 9 pages.

* cited by examiner

NEEDLE FOR A CHOKE VALVE ASSEMBLY

CROSS-REFERENCE TO RELATED APPLICATIONS

This application is a National Stage Entry of International Application No. PCT/US2022/070249, filed Jan. 19, 2022, which claims the benefit of, and priority to, U.S. Patent Application No. 63/141,325, filed Jan. 25, 2021 and titled "Needle for a Choke Valve Assembly", which application is expressly incorporated herein by this reference in its entirety.

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies search for and extract oil, natural gas, and other subterranean resources from the earth. Once a desired subterranean resource is discovered, drilling and production systems are employed to access and extract the resource. These systems may be located onshore or offshore depending on the location of a desired resource. Production systems may include a variety of flow control devices to control a flow rate, a pressure, other fluid properties, or a combination thereof, of fluid flowing through the production system. For example, choke valves may be used to control the flow of production fluid (e.g., oil, natural gas, etc.) from a well.

Certain choke valves (e.g., needle valves) include a seat and a needle movable relative to the seat. While the needle is engaged with the seat, the flow of fluid through the choke valve is substantially blocked. As the needle moves away from the seat, a cross-sectional area of an orifice formed by the seat and the needle progressively increases, thereby increasing the flow rate of the fluid through the choke valve. An actuator coupled to the needle may drive the needle to move relative to the seat. In certain applications, the fluid may contain a significant amount of abrasive material (e.g., sand, rock particles, etc.). Over time, flow of the abrasive material through the choke valve may cause the needle to wear, thereby changing the shape of the needle. As a result, the performance of the choke valve may be altered, and/or the operational effectiveness of the choke valve may be reduced.

BRIEF DESCRIPTION

In certain embodiments, a needle for a choke valve assembly includes a base portion formed from a first non-superhard material and a tip portion formed from a superhard material. The needle also includes a brazed connection coupling the tip portion to the base portion. The brazed connection includes an insert formed from a second non-superhard material, in which the second non-superhard material is harder than the first non-superhard material and softer than the superhard material. In addition, the brazed connection includes a shim disposed between the insert and the base portion, a first layer of brazing material disposed between the base portion and the shim, and a second layer of brazing material disposed between the shim and the insert.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
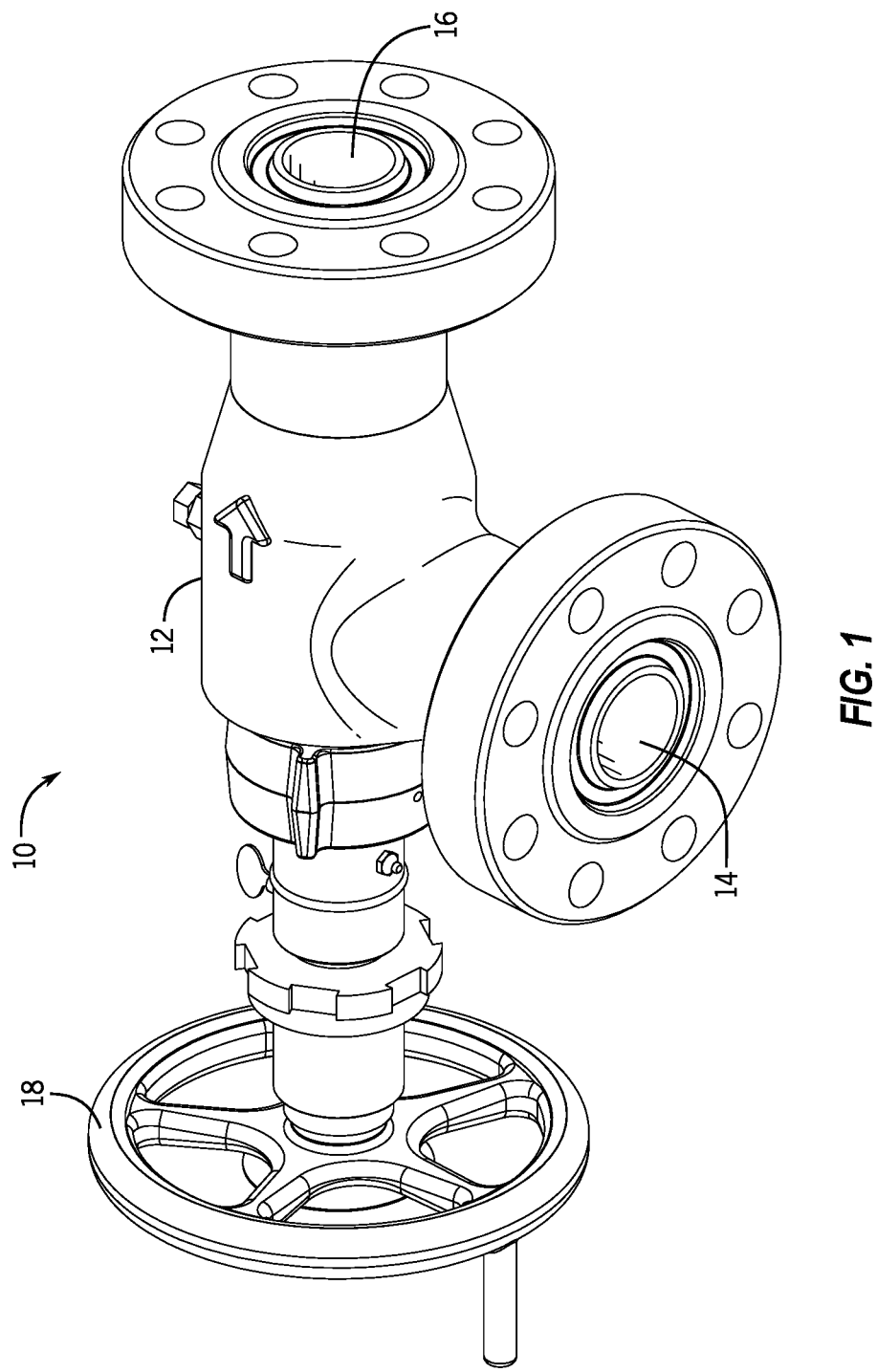
FIG. 1 is a perspective view of an embodiment of a choke valve assembly.

FIG. 1 is a perspective view of an embodiment of a choke valve assembly 10. As illustrated, the choke valve assembly 10 includes a body 12 having an inlet 14 and an outlet 16. While the choke valve assembly 10 is in an open state, fluid flow through the body 12 from the inlet 14 to the outlet 16 is enabled. In addition, while the choke valve assembly 10 is in a closed state, fluid flow through the body 12 is blocked. In the illustrated embodiment, the choke valve assembly 10 includes a handle 18 configured to transition the choke valve assembly 10 between the open and closed states via manual actuation of the handle 18. In other embodiments, the choke valve assembly may include an actuator (e.g., alone or in addition to the handle), such as a hydraulic actuator, a pneumatic actuator, an electromechanical actuator, another suitable actuator, or a combination thereof, configured to drive the choke valve assembly between the open and closed states. The choke valve assembly 10 may be used within a production system to control a flow rate of fluid from a well, or within any other suitable system to control fluid flow. For example, the choke valve assembly 10 may be used to vary the flow rate of fluid pumped into a well, e.g., while drilling.

The choke valve assembly 10 includes a needle configured to move along a longitudinal axis of the choke valve assembly. With the choke valve assembly in the closed state, the needle is engaged with a seat of the choke valve assembly, thereby blocking flow of the fluid through the body 12. Movement of the needle away from the seat along the longitudinal axis forms an orifice between the needle and the seat, thereby transitioning the choke valve assembly to the open state and facilitating flow of the fluid through the body 12. In certain embodiments, the needle includes a base portion formed from a first non-superhard material and a tip portion formed from a superhard material. The needle also includes a brazed connection coupling the tip portion to the base portion. The brazed connection includes an insert formed from a second non-superhard material, in which the second non-superhard material is harder than the first non-superhard material and softer than the superhard material. The brazed connection also includes a shim disposed between the insert and the base portion, a first layer of brazing material disposed between the base portion and the shim, and a second layer of brazing material disposed between the shim and the insert. Due to the configuration of the brazed connection, the brazed connection may accommodate a difference in thermal expansion between the tip portion and the base portion, thereby maintaining the coupling between the tip portion and the base portion at higher temperatures. In addition, because the tip portion is formed from superhard material, the longevity of the needle may be increased.

Figure 2:
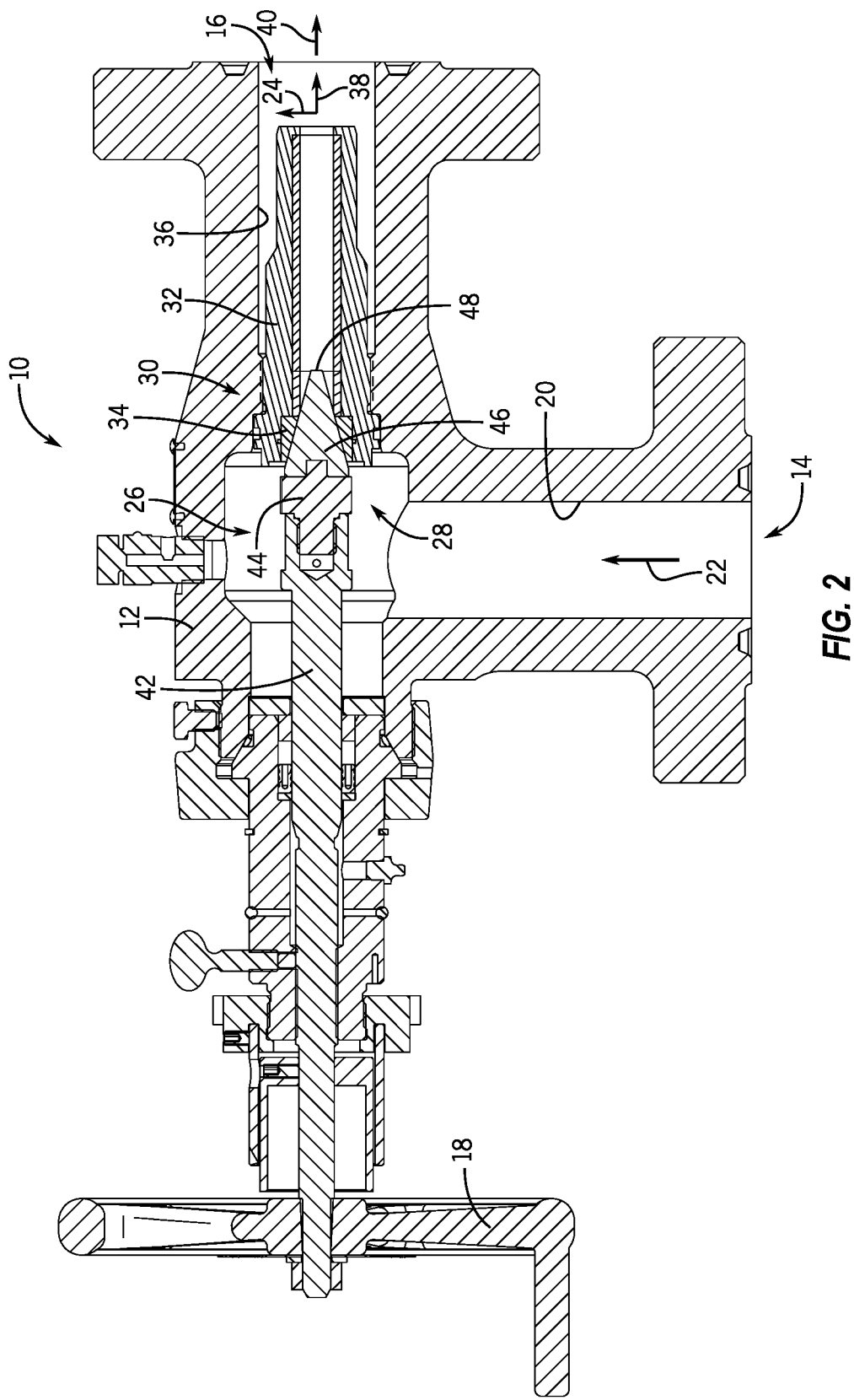
FIG. 2 is a cross-sectional view of the choke valve assembly of FIG. 1.

FIG. 2 is a cross-sectional view of the choke valve assembly 10 of FIG. 1. As previously discussed, the body 12 of the choke valve assembly includes an inlet 14 and an outlet 16. Fluid (e.g., from a well, etc.) may enter the inlet 14 and flow through an inlet passage 20 of the body 12 along an inlet flow direction 22 (e.g., along a radial axis 24 of the choke valve assembly 10). The fluid entering the inlet 14 may be at a relatively high pressure (e.g., greater than 500 psi (3.45 MPa), greater than 1000 psi (6.89 MPa), greater than 5000 psi (34.47 MPa), greater than 10,000 psi (68.95 MPa), greater than 15,000 psi (103.42 MPa), greater than 20,000 psi (137.90 MPa), greater than 25,000 psi (172.37 MPa), or greater than 30,000 psi (206.84 MPa)), and a significant amount of abrasive material (e.g., sand, particles, etc.) may be entrained within the fluid. For example, the fluid may enter the inlet 14 after being used for fracking a reservoir and may, therefore, include a significant amount of sand. The fluid flows through the inlet 20 along the inlet flow direction 22 to a cavity 26 within the body 12.

As illustrated, the choke valve assembly 10 includes a needle 28 and a seat assembly 30 (e.g., forming a choke trim). In the illustrated embodiment, the seat assembly 30 includes a housing 32 and a seat 34 (e.g., forming a positive bean). The housing 32 includes an internal passage, and the seat 34 is disposed within the internal passage of the housing. In addition, the seat 34 has a flow passage extending through the seat 34. With the choke valve assembly 10 in the illustrated closed state, the needle 28 is engaged with the seat 34, thereby blocking flow of the fluid from the cavity 26 to an outlet passage 36 that extends to the outlet 16. Movement of the needle 28 away from the seat assembly 30 along a longitudinal axis 38 of the choke valve assembly 10 forms an orifice between the needle 28 and the seat 34, thereby facilitating flow of the fluid from the cavity 26, through the flow passage of the seat 34, and into the outlet passage 36. The fluid then flows through the outlet passage 36 along an outlet flow direction 40 (e.g., along the longitudinal axis 38) to the outlet 16. Due to the shape of the needle 28, the cross-sectional area of the orifice increases as the needle 28 moves away from the seat 34. Accordingly, the flow rate of the fluid through the choke valve assembly 10 may be controlled by controlling the position of the needle 28 relative to the seat 34.

As illustrated, the needle 28 is coupled to a shaft 42 (e.g., by a threaded connection, a press-fit connection, a shrink-fit connection, a brazed connection, an adhesive connection, etc.), and the shaft 42 supports the needle 28 within the body 12 of the choke valve assembly 10. In addition, the shaft 42 is configured to drive the needle 28 to move along the longitudinal axis 38, thereby controlling the position of the needle 28 relative to the seat 34. In the illustrated embodiment, the handle 18 of the choke valve assembly 10 is coupled to the shaft and configured to drive the shaft 42 to move along the longitudinal axis 38. While the shaft 42 is driven to move by the handle 18 in the illustrated embodiment, in other embodiments, the shaft may be driven to move by another suitable actuator (e.g., alone or in addition to the handle), such as a hydraulic actuator, a pneumatic actuator, an electromechanical actuator, another suitable actuator, or a combination thereof.

Press-fitting includes coupling components to one another via engagement of a protrusion of one component with a recess of the other component (e.g., in which a cross-sectional area of the protrusion is greater than or equal to the cross-sectional area of the recess). Components may be coupled by press-fitting while the components are at an ambient temperature via application of an external force. Furthermore, shrink-fitting includes coupling components to one another via adjusting the temperature of at least one component, engaging a protrusion of one component with a recess of the other component, and enabling the at least one component to return to the ambient temperature. For example, the components may be coupled by shrink-fitting via heating the component with the recess to expand the recess, disposing the protrusion within the recess, and enabling the heated component to return to the ambient temperature. Additionally or alternatively, in certain embodiments, the components may be coupled by shrink-fitting via cooling the component with the protrusion to contract the protrusion, disposing the protrusion within the recess, and enabling the cooled component to return to the ambient temperature. In addition, brazing includes disposing a brazing material (e.g., wire, paste, solder, foil, etc.) between components, heating the brazing material (e.g., to at least partially melt the brazing material and to promote wetting between the brazing material and the components), and enabling the brazing material to cool to couple the components to one another. Furthermore, bonding includes disposing an adhesive (e.g., cement, high performance thermoplastic(s) (e.g., polyether (ether) ketone (P(E)EK), polysulfone, polyphenylene sulfide), epoxy resin, etc.) between components to couple the components to one another.

In the illustrated embodiment, the needle 28 includes a base portion 44 and a tip portion 46. As illustrated, the base portion 44 is coupled to the shaft 42 (e.g., by a threaded connection, a mechanical connection, a press-fit connection, a shrink-fit connection, a brazed connection, an adhesive connection, etc.), and the tip portion 46 is coupled to the base portion (e.g., by a threaded connection, a press-fit connection, a shrink-fit connection, a brazed connection, an adhesive connection, etc.). The base portion 44 is formed from a non-superhard material, the tip portion is formed from a superhard material, and a tip 48 of the needle 28 is formed by the tip portion 46. As used herein, "superhard" refers to a material having a hardness of greater than or equal to 20 GPa based on Vickers hardness testing, and/or a material having a hardness of greater than or equal to 4500 Hardness Brinell (B) on the Brinell scale. Superhard materials may include diamond (e.g., polycrystalline diamond) or other superhard material(s), such as cubic boron nitride. Forming the tip portion 46 of the needle 28 from superhard material may substantially increase the longevity of the needle 28 (e.g., as compared to a needle in which the tip portion is formed from a non-superhard material). For example, a significant amount of abrasive material (e.g., sand, particles, etc.) may be entrained within the fluid flowing through the choke valve assembly 10 (e.g., while the choke valve assembly is in the open state). The abrasive material may flow through the orifice, which is formed by the tip portion 46 of the needle 28 and the seat 34, at a substantial speed. However, because the tip portion 46 of the needle 28 is formed from superhard material, wear/abrasion of the tip portion 46 may be substantially reduced (e.g., as compared to a needle having a tip portion formed from a non-superhard material), thereby increasing the longevity of the needle.

Furthermore, in certain embodiments, the seat 34 of the seat assembly 30 may be formed from superhard material (e.g., diamond, etc.). As previously discussed, the orifice is formed by the tip portion 46 of the needle 28 and the seat 34, and fluid containing a significant amount of abrasive material may flow through the orifice at a substantial speed. Because the seat 34 is formed from superhard material, wear/abrasion of the seat 34 may be substantially reduced (e.g., as compared to a seat formed from a non-superhard material), thereby increasing the longevity of the seat 34. Furthermore, in the illustrated embodiment, the needle has an angled seat-engaging surface, and the seat has an angled needle-engaging surface. In certain embodiments, the angle of the seat-engaging surface of the needle and the angle of the needle-engaging surface of the seat may be substantially equal, thereby establishing an effective seal while the choke valve assembly is in the closed state.

While the tip portion 46 of the needle 28 and the seat 34 of the seat assembly 30 are formed from superhard material in the illustrated embodiment, in other embodiments, the tip portion and/or the seat may be formed from a non-superhard material. Furthermore, the seat assembly housing 32 may be formed from a superhard material or a non-superhard material. In addition, while the seat assembly 30 includes a seat 34 and a housing 32 in the illustrated embodiment, in other embodiments, the housing may be omitted (e.g., the seat may couple to the body of the choke valve assembly). Furthermore, while the needle 28 includes the tip portion 46 and the base portion 44 in the illustrated embodiment, in other embodiments, the needle may include more or fewer portions (e.g., 1, 3, 4, or more). In addition, the tip portion 46 of the needle 28 may be removably coupled to the base portion 44 of the needle 28, the needle 28 may be removably coupled to the shaft 42, the seat 34 may be removably coupled to the seat assembly housing 32, the seat assembly housing 32 may be removably coupled to the body 12 of the choke valve assembly 10, or a combination thereof. Accordingly, the tip portion 46 of the needle 28, the needle 28, the seat 34, the seat assembly 30, or a combination thereof, may be removed and replace (e.g., due to wear of component(s), to establish different orifice configurations for different applications, etc.).

In certain embodiments, a cover layer/shell formed from superhard material may be applied to an inner surface of the inlet passage 20, an inner surface of the outlet passage 36, an inner surface of the cavity 26, or a combination thereof. For example, sleeve(s) formed from superhard material (e.g., diamond, etc.) may be formed separately from the housing and coupled to the inner surface(s) of the inlet passage and/or the outlet passage. Each sleeve may be coupled to the respective passage by a brazed connection, an adhesive connection, a press-fit connection, a shrink-fit connection, a threaded connection, a mechanical connection, a fastener connection, other suitable connection(s), or a combination thereof. Furthermore, in certain embodiments, the cover layer may be formed on the inner surface(s) of the inlet passage, the outlet passage, the cavity, or a combination thereof, by a chemical vapor deposition (CVD) process.

As used herein, a component "formed from" superhard material refers to a component in which at least the fluid-engaging surface(s) of the component are formed entirely by the superhard material. For example, the component may include a shell having outer layer(s) formed entirely of superhard material, in which the shell is coupled to a base/core of the component (e.g., by a brazed connection, an adhesive connection, a press-fit connection, a shrink-fit connection, a mechanical connection, a fastener connection, a threaded connection, other suitable connection(s), or a combination thereof) or formed on the base/core of the component (e.g., by a CVD process). Furthermore, a component having outer layer(s) formed entirely of superhard material may be formed as a single element (e.g., by a molding process, by a high-pressure high-temperature (HPHT) sintering process, by a machining/engraving/ablation process, by other suitable process(es), or a combination thereof). For example, diamond particles (e.g., diamond particle waste, etc.), powdered material (e.g., tungsten, silicon, etc.), and a metal (e.g., a cobalt alloy) may be formed into a desired shape within a press. The pressed elements may then be subjected to HPHT sintering to form a component having a core formed from the material (e.g., which may be chemically altered, such as forming tungsten carbide from the tungsten, forming silicon carbide from the silicon, etc.) and a diamond shell. The HPHT sintering process includes applying high pressure (e.g., greater than 5 GPa) and high temperature (e.g., greater than 1400° C.) to the elements to establish a polycrystalline diamond component. In certain embodiments, the pressed elements are reshaped within the HPHT sintering process, or the pre-HPHT forming step may be omitted, and the elements may be formed into the desired shape during the HPHT sintering process. Additionally or alternatively, a diamond component (e.g., a polycrystalline diamond component, a natural diamond component formed entirely of diamond, a synthetic diamond component formed entirely of diamond, etc.) may be shaped via a laser ablation process, a machining process, an electrical discharge machining/grinding (EDM/EDG) process, or a combination thereof.

In the chemical vapor deposition (CVD) process, a diamond cover layer/shell may be grown onto the base/core.

For example, layers of diamond are grown onto the base/core until a diamond cover layer/shell having a desired thickness is established. The layers closest to the core may include a mixture of the non-superhard material of the base/core and diamond. For example, a layer closest to the non-superhard material of the base/core may be substantially non-superhard material with a small amount of diamond. As additional layers are added/grown, the content of diamond relative to the base/core material increases until entirely diamond layers are formed (e.g., which establishes a diamond gradient). While growing layers of diamond onto a base/core using a CVD process is disclosed above, in certain embodiments, layers of diamond (e.g., including the diamond gradient) may be formed onto a base/core using the HPHT sintering process disclosed above. Furthermore, in certain embodiments, a shell may be formed separately from a base/core using the CVD process or the HPHT sintering process and coupled to the base/core.

Figure 3:
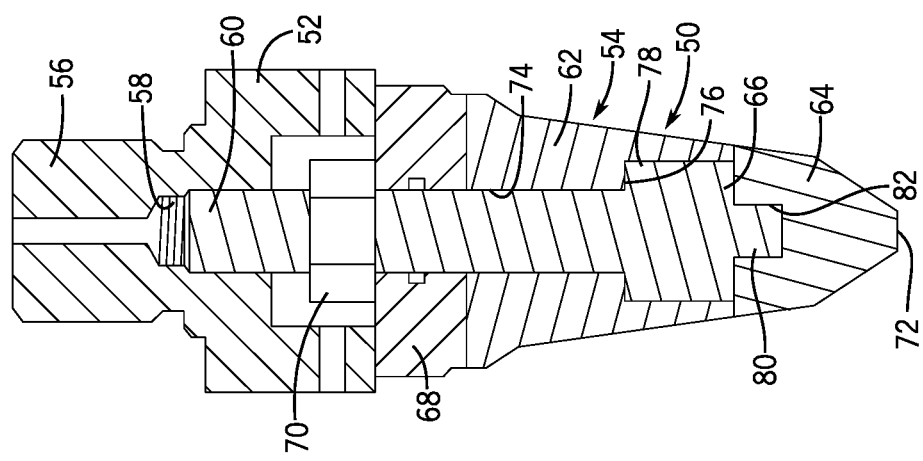
FIG. 3 is a cross-sectional view of an embodiment of a needle that may be employed within the choke valve assembly of FIG. 1.

FIG. 3 is a cross-sectional view of an embodiment of a needle 50 that may be employed within the choke valve assembly of FIG. 1. In the illustrated embodiment, the needle 50 includes a base portion 52 and a tip portion 54. The base portion 52 includes a mounting portion 56 configured to couple to the shaft (e.g., by a threaded connection, a mechanical connection, a press-fit connection, a shrink-fit connection, a brazed connection, an adhesive connection, etc.). In addition, the tip portion 54 of the needle 50 is coupled to the base portion 52 by a threaded connection. As illustrated, the base portion 52 of the needle 50 has a threaded recess 58, and the tip portion 54 of the needle 50 has a corresponding threaded shaft 60 configured to engage the threaded recess 58 to couple the tip portion 50 to the base portion 52.

In the illustrated embodiment, the tip portion 54 of the needle 50 includes a seat-engaging element 62, a tip element 64, a retainer 66, a spacer 68, and a nut 70. The seat-engaging element 62 is configured to engage a respective seat while the choke valve assembly is in the closed state, and the seat-engaging element 62 and the respective seat are configured to form the orifice while the choke valve assembly is in the open state. As illustrated, the retainer 66 includes the threaded shaft 60, and the tip element 64 forms a tip 72 of the needle 50.

To form the tip portion 54 of the needle 50, the tip element 64 is coupled to the retainer 66 by suitable connection(s), such as a threaded connection, a press-fit connection, a shrink-fit connection, a brazed connection, an adhesive connection, other suitable connection(s), or a combination thereof. In addition, the seat-engaging element 62 is engaged with the retainer 66. As illustrated, with the seat-engaging element 62 engaged with the retainer 66, the threaded shaft 60 extends through a central passage 74 of the seat-engaging element 62, and a shoulder 76 of the seat-engaging element 62 contacts an engagement portion 78 of the retainer 66. Once the seat-engaging element 62 is engaged with the retainer 66, the spacer 68 may be disposed on the threaded shaft 60, and the nut 70 may be engaged with the threaded shaft 60. Movement of the spacer 68 and the seat-engaging element 62 along the threaded shaft 60 is blocked by the nut 70 and the engagement portion 78 of the retainer 66. In addition, radial movement of the spacer 68 and the seat-engaging element 62 relative to the retainer 66 is blocked by engagement with the retainer 66. Once the tip portion 54 is formed, the threaded shaft 60 of the tip portion 54 may be engaged with the threaded recess 58 of the base portion 52 to couple the tip portion 54 to the base portion 52. The nut 70 enables the tip portion 54 to be fully formed before engagement with the base portion 52. Accordingly, the process of coupling the tip portion to the base portion may be less complex and time-consuming (e.g., as compared to a needle in which the nut is omitted, and the seat-engaging element and the spacer are disposed on the threaded shaft before the threaded shaft is engaged with the threaded recess of the base portion). In addition, the nut 70 may enable the compression force applied to the seat-engaging element 62 and the spacer 68 to be established before the tip portion 54 is engaged with the base portion 52, and the nut 70 may enable the compression force to be greater than the contact force between the spacer 68 and the base portion 52.

In certain embodiments, the tip element 64 may be coupled to the retainer 66 after the seat-engaging element 62 is engaged with the retainer 66, the spacer 68 is disposed on the threaded shaft 60, and the nut 70 is engaged with the threaded shaft 60. Furthermore, in certain embodiments, the tip element 64 may be coupled to the retainer 66 after the seat-engaging element 62 is engaged with the retainer 66, the spacer 68 is disposed on the threaded shaft 60, the nut 70 is engaged with the threaded shaft 60, and the threaded shaft 60 of the tip portion 54 is engaged with the threaded recess 58 of the base portion 52. For example, the retainer 66 may include an engagement feature 80 configured to facilitate rotation of the threaded shaft 60 and/or to facilitate blocking rotation of the threaded shaft 60, thereby facilitating engagement of the nut 70 with the threaded shaft 60 and/or facilitating engagement of the threaded shaft 60 with the threaded recess 58. The engagement feature 80 may include any suitable element/structure configured to enable an external torque (e.g., applied by a tool, applied by a hand, etc.) to drive the threaded shaft 60 to rotate and/or to block rotation of the threaded shaft 60. In the illustrated embodiment, the engagement feature 80 includes a polygonal protrusion configured to engage a corresponding polygonal recess of a tool to enable the tool to drive the threaded shaft 60 to rotate and/or to block rotation of the threaded shaft 60. While the engagement feature 80 includes a polygonal protrusion in the illustrated embodiment, in other embodiments, the engagement feature may include a protrusion of any other suitable shape (e.g., elliptical, star-shaped, etc.), or the engagement feature may include a recess having any suitable shape (e.g., polygonal, star-shaped, elliptical, etc.).

In the illustrated embodiment, the tip element 64 includes a cavity 82 configured to receive the engagement feature 80. However, in embodiments in which the engagement feature includes a recess, the cavity of the tip element may be omitted, and in certain embodiments, the tip element may include a protrusion configured to engage the recess. Furthermore, in embodiments in which the retainer does not include an engagement feature, the cavity of the tip element may be omitted. In addition, in certain embodiments, the engagement feature may include a protrusion, and the protrusion may be removed (e.g., by a machining process) before the tip element (e.g., which does not include a cavity) is coupled to the retainer. Furthermore, in certain embodiments, the engagement feature may include a threaded protrusion. A second nut may be engaged with the threaded protrusion to facilitate driving the threaded shaft to rotate and/or to facilitate blocking rotation of the threaded shaft during the process of engaging the first nut with the threaded shaft and/or the process of engaging the threaded shaft with the threaded recess of the base portion. After the first nut is engaged with the threaded shaft and/or the threaded shaft is engaged with the threaded recess of the base portion, the second nut may be removed, and the threaded protrusion may be engaged with a threaded recess of the tip element to couple the tip element to the retainer. In addition, in certain embodiments, the threaded protrusion may be removed (e.g., by a machining process) before the tip element is coupled to the retainer.

Furthermore, one or more anti-rotation devices/systems may be used for at least one of the threaded connections disclosed above (e.g., the threaded connection between the nut 70 and the threaded shaft 60, the threaded connection between the threaded shaft 60 and the threaded recess 58, etc.) to block rotation of the respective components relative to one another. For example, in certain embodiments, the anti-rotation device(s)/system(s) may include a thread-locking adhesive that may be disposed on the threads of at least one component before the components are coupled to one another by the threaded connection. Additionally or alternatively, in certain embodiments, the anti-rotation device(s)/system(s) may include a pin (e.g., cotter pin, etc.) configured to extend through openings in the components to block rotation of the components relative to one another. Furthermore, any other suitable anti-rotation device(s)/system(s) may be used to block rotation of respective components relative to one another (e.g., alone or in combination with the thread-locking adhesive and/or the pin), such as clip(s), a nut (e.g., a counter-threaded nut, etc.), wedge-locking washers, other suitable anti-rotation device(s)/system(s), or a combination thereof.

In the illustrated embodiment, the tip element 64 is formed from non-superhard material (e.g., tungsten carbide, etc.), the retainer 66 is formed from non-superhard material (e.g., tungsten carbide, steel, etc.), the seat-engaging element 62 is formed from (e.g., formed entirely from) superhard material (e.g., diamond, etc.), the spacer 68 is formed from non-superhard material (e.g., steel, stainless steel, a nickel alloy, etc.), the nut 70 is formed from non-superhard material (e.g., steel, stainless steel, a nickel alloy, etc.), and the base portion 52 is formed from non-superhard material (e.g., steel, stainless steel, a nickel alloy, etc.). In certain embodiments, the non-superhard material of the tip element may be harder than the non-superhard materials of the spacer, the nut, and the base portion. Furthermore, while the base portion, the spacer, and the tip element are formed from non-superhard material in the illustrated embodiment, in other embodiments, at least one of the base portion, the spacer, or the tip element may be formed from superhard material.

In addition, while the tip portion 54 includes a single spacer 68 between the seat-engaging element 62 and the base portion 52 in the illustrated embodiment, in other embodiments, the tip portion may include more or fewer spacers (e.g., 0, 2, 3, 4, or more) positioned at any suitable location(s) on the tip portion (e.g., between the seat-engaging element and the base portion and/or between the seat-engaging element and the tip element). Furthermore, while the tip element 64 and the retainer 66 are separate elements in the illustrated embodiment, in other embodiments, the tip element and the retainer may be integrally formed as a single element. In addition, while movement of the seat-engaging element and, in certain embodiments, the spacer(s) away from the nut along the threaded shaft is blocked by contact between the shoulder of the seat-engaging element and the engagement portion of the retainer in the illustrated embodiment, in other embodiments, movement of the seat-engaging element/spacer(s) away from the nut may be blocked by another suitable connection between the seat-engaging element and the retainer. For example, in certain embodiments, the retainer may only include the threaded shaft, and threads of the threaded shaft may engage corresponding threads within a threaded recess of the seat-engaging element to couple the retainer/threaded shaft to the seat-engaging element. In such embodiments, the seat-engaging element may be formed by a CVD process or an HPHT sintering process that forms a superhard shell over a non-superhard core, and the threaded recess may be formed within the non-superhard core. Furthermore, in certain embodiments, the retainer may be coupled to the seat-engaging element by other suitable connection(s) (e.g., alone or in combination with the shoulder/engagement portion connection and/or the threaded connection), such as an adhesive connection, other suitable type(s) of mechanical connection(s), a brazed connection, a press-fit connection, a shrink-fit connection, other suitable type(s) of connection(s), or a combination thereof. In embodiments in which the central passage of the seat-engaging element does not extend through the entire longitudinal extent of the seat-engaging element, the tip of the needle may be formed by the seat-engaging element. In addition, while engagement of the threaded shaft with the threaded recess of the base portion couples the tip portion to the base portion in the illustrated embodiment, in other embodiments, the threaded shaft (e.g., a portion of the threaded shaft that is not threaded) may engage a non-threaded recess of the base portion, and an adhesive connection, a mechanical connection, a brazed connection, a press-fit connection, a shrink-fit connection, a fastener connection, other suitable connection(s), or a combination thereof, between the threaded shaft and the base portion (e.g., at the recess) may couple the tip portion to the base portion.

Figure 4:
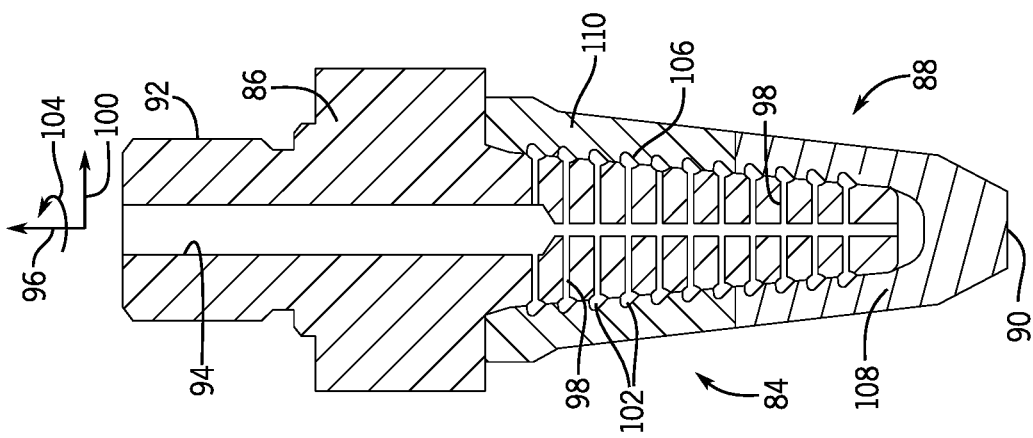
FIG. 4 is a cross-sectional view of another embodiment of a needle that may be employed within the choke valve assembly of FIG. 1.

FIG. 4 is a cross-sectional view of another embodiment of a needle 84 that may be employed within the choke valve assembly of FIG. 1. In the illustrated embodiment, the needle 84 includes a core 86 and a shell 88 disposed about the core 86. As illustrated, the shell extends to a tip 90 of the needle 84. In addition, the core 86 includes a mounting portion 92 configured to couple to the shaft (e.g., by a threaded connection, a press-fit connection, a shrink-fit connection, a brazed connection, an adhesive connection, etc.). In the illustrated embodiment, the core 86 is formed from a non-superhard material (e.g., steel, tungsten carbide, etc.), and the shell 88 is formed from (e.g., formed entirely from) a superhard material (e.g., diamond, etc.). Forming the shell 88, which extends to the tip 90 of the needle 84, from superhard material may substantially increase the longevity of the needle 84 (e.g., as compared to a needle in which a tip portion is formed from a non-superhard material). For example, a significant amount of abrasive material (e.g., sand, particles, etc.) may be entrained within the fluid flowing through the choke valve assembly (e.g., while the choke valve assembly is in the open state). The abrasive material may flow through the orifice, which is formed by the shell 88 of the needle 84 and a respective seat, at a substantial speed. However, because the shell 88 of the needle 84 is formed from superhard material, wear/abrasion of the needle may be substantially reduced (e.g., as compared to a needle having a tip portion formed from a non-superhard material), thereby increasing the longevity of the needle. While the core of the needle is formed from non-superhard material in the illustrated embodiment, in other embodiments, the core may be formed from superhard material.

In the illustrated embodiment, the shell 88 is coupled to the core 86 via a liquid injection process, in which the injected liquid solidifies and/or cures to couple the shell 88 to the core 86 (e.g., via an adhesive bond, via a frictional connection, via a metallurgical connection, via a mechanical connection, via other suitable type(s) of connection(s), or a combination thereof). For example, in certain embodiments, molten metal/alloy, such as a low melting temperature metal/alloy (e.g., including one or more of zinc, tin, or antimony, among other suitable component(s), and/or having a melting temperature less than about 800° C., about 700° C., about 600° C., about 500° C., or about 400° C.), may be disposed between the core 86 and the shell 88. As the molten metal/alloy cools and solidifies, the metal/alloy forms a connection (e.g., interlocking mechanical connection, frictional connection, etc.) between the core 86 and the shell 88. Furthermore, in certain embodiments, another suitable liquid, such as epoxy resin, high performance thermoplastic(s) (e.g., P(E)EK, polysulfone, polyphenylene sulfide, etc.), or cement, may be disposed (e.g., at ambient temperature, above the melting temperature of the liquid, etc.) between the core 86 and the shell 88. As the liquid cures/solidifies, a connection (e.g., adhesive bond, frictional connection, mechanical connection, etc.) is formed between the core 86 and the shell 88.

In the illustrated embodiment, the core 86 includes an inlet passage 94 extending along a longitudinal axis 96 of the needle 84 and configured to receive the liquid (e.g., molten metal/alloy, epoxy resin, P(E)EK, cement, filler material, etc.). In addition, the core 86 includes multiple distribution passages 98, and each distribution passage 98 extends outwardly from the inlet passage 94 along a radial axis 100 of the needle 84. Furthermore, multiple recesses 102 are formed within the core 86 (e.g., via a machining process, via a laser ablation process, via an electrical discharge machining/grinding (EDM/EDG) process, etc.), and the distribution passages 98 extend to the recesses 102. In the illustrated embodiment, each recess 102 extends about the core 86 along a circumferential axis 104 of the needle 84. Furthermore, in the illustrated embodiment, two distribution passages 98 extend to each recess 102. However, in other embodiments, more or fewer distribution passages (e.g., 1, 3, 4, 5, 6, or more) may extend to each recess. In addition, while each recess 102 extends about an entire circumferential extent of the core 86 in the illustrated embodiment, in other embodiments, at least one recess may extend about a portion of the circumferential extent of the core. For example, the core may include multiple recesses at the same longitudinal position, each recess may extend about a portion of the circumferential extent of the core, and one or more distribution passages may extend to each respective recess.

Furthermore, in the illustrated embodiment, the shell 88 includes multiple recesses 106 (e.g., which may be formed by a machining process, by a laser ablation process, by an electrical discharge machining/grinding (EDM/EDG) process, etc.), and one or more recesses 106 of the shell 88 are aligned with one or more corresponding recesses 102 of the core 86. For example, in embodiments in which the core includes multiple recesses at the same longitudinal position, the shell may include a single recess aligned with the multiple recesses of the core, or the shell may include multiple respective recesses aligned with the multiple recesses of the core. Furthermore, in certain embodiments, the shell may include at least one recess having a larger longitudinal extent, in which the at least one recess of the shell is aligned with multiple longitudinally offset recesses of the core. The core and the shell may have any suitable number of recesses (e.g., 0, 1, 2, 3, 4, 5, 6, 7, 8, 9, 10, 11, 12, 13, 14, 15, or more). For example, in certain embodiments, the recesses of the shell may be omitted and/or the recesses of the core may be omitted. Furthermore, in certain embodiments, the core may be spaced apart from the shell to establish a cavity between the core and the shell, which is configured to receive the liquid (e.g., molten metal/alloy, epoxy resin, P(E)EK, cement, etc.).

The liquid (e.g., molten metal/alloy, epoxy resin, P(E)EK, cement, etc.) may be injected into the inlet passage 94 at any suitable pressure (e.g., 5 psi (34.47 kPa), 10 psi (68.95 kPa), 25 psi (0.17 MPa), 50 psi (0.34 MPa), 100 psi (0.69 MPa), 300 psi (2.07 MPa), 500 psi (3.45 MPa), 800 psi (5.12 MPa), 1000 psi (6.89 MPa), 1500 psi (10.34 MPa), 2000 psi (13.79 MPa), 2500 psi (17.24 MPa), 3000 psi (20.68 MPa), or more). The liquid flows through the inlet passage 94 to the distribution passage(s) 98, and the liquid flows through the distribution passage(s) 98 to the cavity/cavities between the core 86 and the shell 88 (e.g., formed by the recess(es) 102 of the core and/or the recesses(es) 106 of the shell 88). During the liquid injection process, the core 86 and the shell 88 may be compressed along the longitudinal axis 96 (e.g., via a clamp, via a mold cavity having the shape of the core and the shell, etc.) to maintain the alignment between the core and the shell. As the injected liquid cools and solidifies, a connection is established between the core 86 and the shell 88.

Furthermore, while a connection formed by liquid injection is disclosed above, in certain embodiments, the shell may be coupled to the core by another suitable connection (e.g., alone or in combination with the connection formed by liquid injection), such as a press-fit connection, a shrink-fit connection, a threaded connection, a mechanical connection, a brazed connection, a fastener connection, an adhesive connection, other suitable connection(s), or a combination thereof. Furthermore, in the illustrated embodiment, the shell includes a first portion 108, which forms the tip 90, and a second portion 110. While the shell 88 includes two portions in the illustrated embodiment, in other embodiments, the shell may include more or fewer portions (e.g., 1, 3, 4, 5, 6, 7, 8, or more).

In the illustrated embodiment, the shell 88 is formed separately from the core 86 and coupled to the core 86. However, in other embodiments, the shell may be formed on the core. For example, a diamond shell may be grown onto the core via a CVD process. As previously discussed, in the CVD process, layers of diamond are grown onto the core until a diamond shell having a desired thickness is established. The layers closest to the core may include a mixture of the non-superhard material of the core and diamond. For example, a layer closest to the non-superhard material of the core may be substantially non-superhard material with a small amount of diamond. As additional layers are added/grown, the content of the superhard material relative to the core material increases until entirely diamond layers are formed (e.g., which establishes a diamond gradient). While growing layers of diamond onto the core using a CVD process is disclosed above, in certain embodiments, layers of diamond (e.g., including the diamond gradient) may be formed onto the core using the HPHT sintering process disclosed above. Furthermore, in certain embodiments, the shell may be formed separately from the core using the CVD process or the HPHT sintering process and coupled to the core (e.g., via the process/structure disclosed above).

Furthermore, in the illustrated embodiment, the shell 88 forms the tip 90 of the needle 84. However, in other embodiments, the core may form the tip, or a tip element coupled to the core may form the tip. For example, in certain embodiments, an opening may extend through the shell along the longitudinal axis, and the core may extend through the entire longitudinal extend of the opening. Accordingly, a portion of the core may extend beyond the longitudinal extent of the shell. The portion of the core may form the tip of the needle, or a tip element may be coupled to the portion of the core to form the tip of the needle. In such embodiments, the shell may form a seat-engaging portion of the needle configured to engage the seat while the choke valve assembly is in the closed state.

Figure 5:
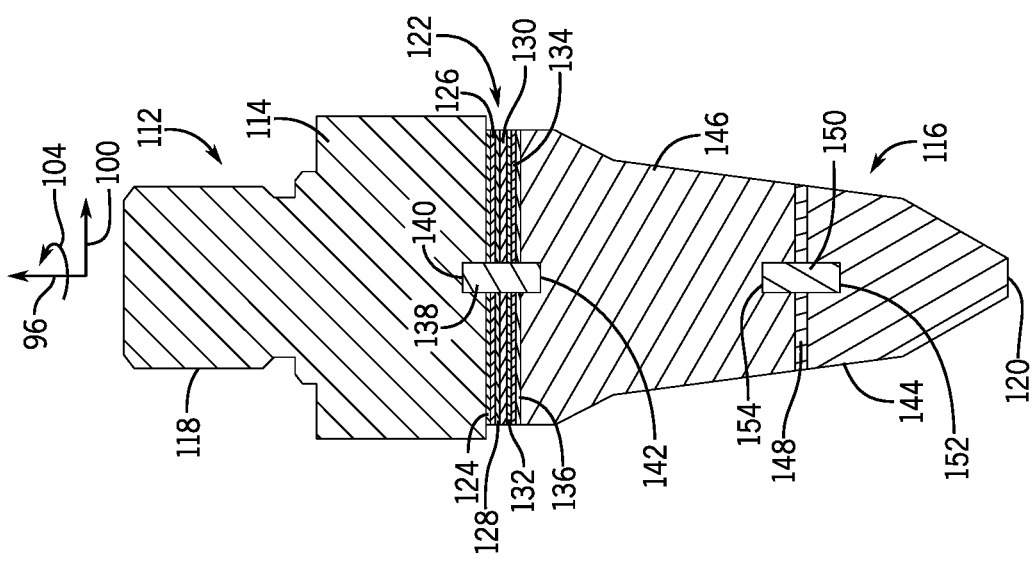
FIG. 5 is a cross-sectional view of a further embodiment of a needle that may be employed within the choke valve assembly of FIG. 1.

FIG. 5 is a cross-sectional view of a further embodiment of a needle 112 that may be employed within the choke valve assembly of FIG. 1. In the illustrated embodiment, the needle 112 includes a base portion 114 and a tip portion 116. The base portion 114 includes a mounting portion 118 configured to couple to the shaft (e.g., by a threaded connection, a mechanical connection, a press-fit connection, a shrink-fit connection, a brazed connection, an adhesive connection, etc.). In addition, the tip portion 116 of the needle 112 is coupled to the base portion 114 of the needle 112 by a brazed connection, as discussed in detail below. In the illustrated embodiment, the base portion 114 is formed from a non-superhard material (e.g., steel, stainless steel, a nickel alloy, etc.), and the tip portion 116 is formed from a superhard material (e.g., diamond, etc.). Furthermore, in the illustrated embodiment, a tip 120 of the needle 112 is formed by the tip portion 116. Forming the tip portion 116 from superhard material may substantially increase the longevity of the needle 112 (e.g., as compared to a needle in which the tip portion is formed from a non-superhard material). For example, a significant amount of abrasive material (e.g., sand, particles, etc.) may be entrained within the fluid flowing through the choke valve assembly (e.g., while the choke valve assembly is in the open state). The abrasive material may flow through the orifice, which is formed by the tip portion 116 of the needle 112 and a respective seat, at a substantial speed. However, because the tip portion 116 of the needle 112 is formed from superhard material, wear/abrasion of the tip portion 116 may be substantially reduced (e.g., as compared to a needle having a tip portion formed from a non-superhard material), thereby increasing the longevity of the needle.

As illustrated, the tip portion 116 is coupled to the base portion 114 by a brazed connection 122. In the illustrated embodiment, the brazed connection 122 includes a first layer of brazing material 124, a first shim 126, a second layer of brazing material 128, an insert 130, a third layer of brazing material 132, a second shim 134, and a fourth layer of brazing material 136. The insert 130 is positioned between the tip portion 116 and the base portion 114, the first shim 126 is positioned between the insert 130 and the base portion 114, and the second shim 134 is positioned between the insert 130 and the tip portion 116. In addition, the first layer of brazing material 124 is disposed between the base portion 114 and the first shim 126, the second layer of brazing material 128 is disposed between the first shim 126 and the insert 130, the third layer of brazing material 132 is disposed between the insert 130 and the second shim 134, and the fourth layer of brazing material 136 is disposed between the second shim 134 and the tip portion 116. The layers of brazing material are configured to couple the elements to one another, thereby coupling the tip portion 116 of the needle 112 to the base portion 114 of the needle 112.

In certain embodiments, the base portion 114 is formed from non-superhard material (e.g., steel, stainless steel, a nickel alloy, etc.), and as previously discussed, the tip portion 116 is formed from superhard material, such as diamond (e.g., polycrystalline diamond). Accordingly, the coefficient of thermal expansion of the base portion 114 may be significantly greater than the coefficient of thermal expansion of the tip portion 116. In addition, while higher temperature fluid is flowing through the choke valve assembly, the needle may be heated to a significant temperature (e.g., about 300° C. to about 800° C., about 400° C. to about 700° C., or about 600° C.). As a result, the base portion 114 may expand significantly more than the tip portion 116. The elements/layers of the brazed connection 112 are configured to accommodate the difference in thermal expansion between the tip portion and the base portion to maintain the coupling between the portions at higher temperatures (e.g., above 300° C., above 500° C., above 600° C., above 700° C., or above 800° C.).

In certain embodiments, the insert 130 may be formed from tungsten carbide, which has a coefficient of thermal expansion between the coefficient of thermal expansion of the non-superhard material (e.g., steel, stainless steel, a nickel alloy, etc.) of the base portion 114 and the coefficient of thermal expansion of the superhard material (e.g., diamond) of the tip portion 116. As a result, the difference in thermal expansion between the base portion and the insert may be less than the difference in thermal expansion between the base portion and the tip portion, and the difference in thermal expansion between the insert and the tip portion may be less than the difference in thermal expansion between the base portion and the tip portion. While an insert formed from tungsten carbide is disclosed above, in certain embodiments, the insert may be formed from another suitable non-superhard material having a coefficient of thermal expansion between the coefficient of thermal expansion of the base material and the coefficient of thermal expansion of the tip portion material. In addition, each shim may be formed from a relatively ductile/malleable material to accommodate the difference in thermal expansion between the base portion and the insert and between the tip portion and the insert. For example, at least one shim may be formed from copper, an alloy including copper, nickel, or an alloy including nickel.

Furthermore, the brazing layers may be formed from any suitable type of brazing material(s) (e.g., suitable for the temperature range, suitable for the types of materials, etc.), such as brazing material(s) including at least one percent titanium (e.g., TICUSIL® active brazing alloy and/or INCUSIL®-ABA™ active brazing alloy by Morgan Advanced Materials of Hayward, CA, and/or APA 4 active brazing alloy, APA 7 active brazing alloy, APA 8 active brazing alloy, APA 9 active brazing alloy, or a combination thereof, by Prince & Izant Company of Cleveland, OH). In certain embodiments, the layers of brazing material may be activated concurrently. For example, one or more pieces of brazing foil may be disposed between the base portion 114 and the first shim 126 to form the first layer of brazing material 124, one or more pieces of brazing foil may be disposed between the first shim 126 and the insert 130 to form the second layer of brazing material 128, one or more pieces of brazing foil may be disposed between the insert 130 and the second shim 134 to form the third layer of brazing material 132, and one or more pieces of brazing foil may be disposed between the second shim 134 and the tip portion 116 to form the fourth layer of brazing material 136. The needle may then be heated to activate the pieces of brazing foil (e.g., to at least partially melt the pieces of brazing foil). As the brazing material cools and solidifies, the first layer of brazing material 124 forms a bond between the base portion 114 and the first shim 126, the second layer of brazing material 128 forms a bond between the first shim 126 and the insert 130, the third layer of brazing material 132 forms a bond between the insert 130 and the second shim 134, and the fourth layer of brazing material 136 forms a bond between the second shim 134 and the tip portion 116, thereby establishing the brazed connection 122 between the base portion 114 and the tip portion 116. In certain embodiments, the heating and cooling process may be performed while the needle is under a compressive load along the longitudinal axis 96. For example, the needle may be disposed within a mold cavity for the heating and cooling process. While forming the layers of brazing material from brazing foil is disclosed above, in certain embodiments, at least one layer of brazing material may be formed by another suitable process/technique, such as applying the brazing material in a liquid/molten state.

The thickness of each element of the brazed connection 122 may be selected (e.g., based on the material of the element) to accommodate the difference in thermal expansion between the tip portion and the base portion and to facilitate the coupling between the portions. For example, in certain embodiments, the insert may have a thickness of about 0.05 inch (in.) (e.g., 0.127 cm) to about 1 in. (e.g., 2.54 cm), about 0.1 in. (e.g., 0.254 cm) to about 0.5 in. (e.g., 1.27 cm), about 0.2 in. (e.g., 0.508 cm) to about 0.4 in. (e.g., 1.016 cm), or about 0.3 in. (e.g., 0.762 cm). Furthermore, in certain embodiments, each shim may have a thickness of about 1 mil (e.g., 0.0254 mm) to about 10 mil (e.g., 0.254 mm), about 2 mil (e.g., 0.0508 mm) to about 8 mil (e.g., 0.2032 mm), or about 2 mil (e.g., 0.0508 mm) to about 6 mil (e.g., 0.1524 mm). In certain embodiments, the thickness of the first shim 126 may be substantially equal to the thickness of the second shim 134. However, in other embodiments, the shims may have different thicknesses. For example, the first shim 126 may be thicker than the second shim 134 (e.g., the thickness of the first shim may be about 6 mil, and the thickness of the second shim may be about 2 mil).

While the brazed connection 122 includes two shims in the illustrated embodiment, in certain embodiments, at least one of the shims may be omitted. For example, in certain embodiments, a thickness and deformability of at least one layer of brazing material may be sufficient to accommodate the difference in thermal expansion between the insert and the base portion/tip portion. In such embodiments, the respective shim(s) may be omitted. Additionally or alternatively, multiple shims may be disposed between the insert and the base portion and/or between the insert and the tip portion. Furthermore, while the brazed connection 122 includes a single insert in the illustrated embodiment, in other embodiments, the brazed connection may include additional inserts (e.g., 1, 2, 3, 4, or more). In such embodiments, layer(s) of brazing material and, in certain embodiments, shim(s) may be disposed between opposing inserts.

In the illustrated embodiment, the needle 112 includes an alignment pin 138 extending through the layers/elements of the brazed connection 122, into a cavity 140 of the base portion 114, and into a cavity 142 of the tip portion 116. The alignment pin 138 is configured to align the base portion 114, the tip portion 116, and the elements of the brazed connection 122 (e.g., the first shim 126, the insert 130, and the second shim 134) during the brazing process and during operation of the choke valve assembly. The alignment pin may be formed from any suitable material (e.g., suitable for the materials of the needle, suitable for the expected operating temperatures, etc.), such as invar (e.g., an alloy including about 36 percent nickel and about 64 percent iron) which has a low coefficient of thermal expansion. While the needle includes a single alignment pin for the base portion and the tip portion in the illustrated embodiment, in other embodiments, the needle may include more or fewer alignment pins (e.g., 0, 2, 3, 4, or more) for the base portion and the tip portion. For example, in certain embodiments, the alignment pin may be omitted. In such embodiments, the base portion may include a protrusion that extends through the layers/components of the brazed connection and into a cavity of the tip portion, and/or the tip portion may include a protrusion that extends through the layers/components of the brazed connection and into a cavity of the base portion.

While the surface of the base portion and the surface of the tip portion that interface with the brazed connection are substantially flat in the illustrated embodiment, in certain embodiments, at least one portion may include a protrusion that interfaces with a cavity of the other portion. For example, in certain embodiments, the tip portion may include a protrusion that engages a cavity of the base portion. In such embodiments, the elements of the brazed connection (e.g., the insert and the shim(s)) may be disposed about the protrusion/cavity between the interfacing surfaces of the tip portion and the base portion. Furthermore, in certain embodiments, the tip portion and the base portion may be coupled to one another by additional suitable connection(s) (e.g., in combination with the brazed connection), such as a fastener connection, a mechanical connection, a threaded connection, a press-fit connection, a shrink-fit connection, other suitable type(s) of connection(s), or a combination thereof. For example, the protrusion and the cavity disclosed above may be threaded to establish a threaded connection between the base portion and the tip portion.

In the illustrated embodiment, the tip portion 116 includes a first element 144, which forms the tip 120, and a second element 146. In certain embodiments, the second element 146 of the tip portion 116 is configured to engage a respective seat while the choke valve assembly is in the closed state, and the second element 146 of the tip portion 116 and the respective seat are configured to form the orifice while the choke valve assembly is in the open state. In the illustrated embodiment, the first element 144 and the second element 146 are formed from (e.g., formed entirely from) superhard material (e.g., diamond). However, in other embodiments, the first element may be formed from non-superhard material (e.g., tungsten carbide, etc.), and the second element may be formed from superhard material. In the illustrated embodiment, the first element 144 and the second element 146 of the tip portion 116 are coupled to one another by a brazed connection 148. For example, in embodiments in which the first and second elements are formed from superhard material, the first and second elements may be coupled to one another by a single layer of brazing material. Furthermore, in embodiments in which the first element is formed from non-superhard material (e.g., tungsten carbide) and the second element is formed from superhard material (e.g., diamond), the first and second elements may be coupled to one another by a brazed connection having a shim, a first layer of brazing material disposed between the shim and the first element, and a second layer of brazing material disposed between the shim and the second element. Furthermore, in certain embodiments, the first and second elements may be coupled to one another by other suitable connection(s) (e.g., alone or in combination with the brazed connection), such as an adhesive connection, a fastener connection, a press-fit connection, a shrink-fit connection, other suitable type(s) of connection(s), or a combination thereof.

In the illustrated embodiment, the needle 112 includes an alignment pin 150 extending through the layer(s)/element(s) of the brazed connection 148, into a cavity 152 of the first element 144, and into a cavity 154 of the second element 146. The alignment pin 150 is configured to align the first element 144, the second element 146, and any element(s) of the brazed connection 148 (e.g., a shim, etc.) during the brazing process and during operation of the choke valve assembly. The alignment pin may be formed from any suitable material (e.g., suitable for the materials of the needle, suitable for the expected operating temperatures, etc.), such as invar (e.g., an alloy including about 36 percent nickel and about 64 percent iron) which has a low coefficient of thermal expansion. While the needle includes a single alignment pin for the first and second elements in the illustrated embodiment, in other embodiments, the needle may include more or fewer alignment pins (e.g., 0, 2, 3, 4, or more) for the first and second elements. For example, in certain embodiments, the alignment pin may be omitted. In such embodiments, the first element may include a protrusion that extends through the layer(s)/component(s) of the brazed connection and into a cavity of the second element, and/or the second element may include a protrusion that extends through the layer(s)/component(s) of the brazed connection and into a cavity of the first element.

While the tip portion 116 includes two elements in the illustrated embodiment, in other embodiments, the tip portion may include more or fewer elements (e.g., arranged along a direction of movement of the needle), such as 1, 3, 4, 5, 6, or more. Furthermore, while the base portion of the needle is formed from non-superhard material in the illustrated embodiment, in other embodiments, the base portion may be formed from superhard material. In addition, while the tip portion of the needle has a substantially conical shape in the illustrated embodiment, in other embodiments, the tip portion of the needle may have any other suitable shape (e.g., in the shape of a shear-cutter, as described below).

Figure 6:
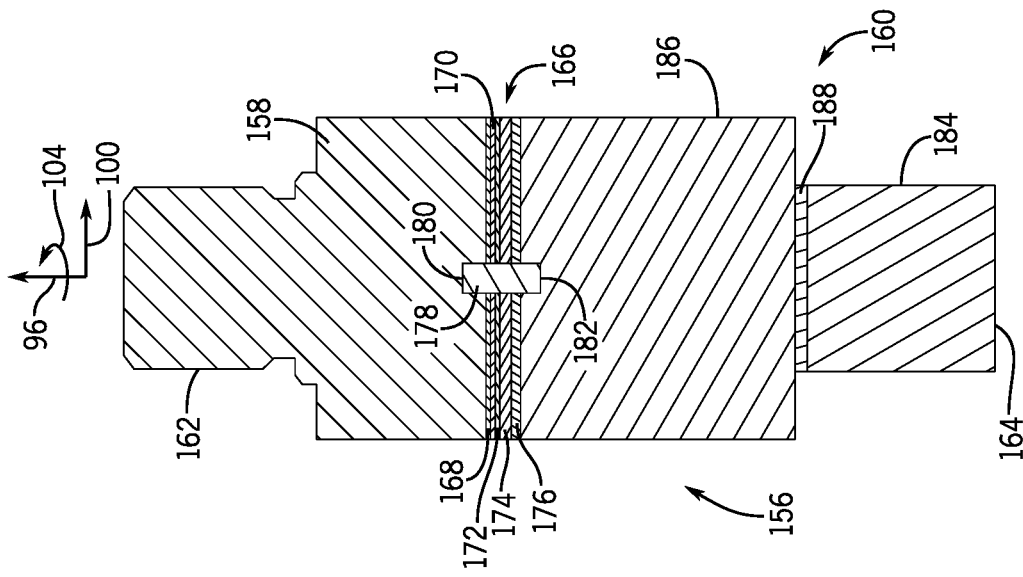
FIG. 6 is a cross-sectional view of another embodiment of a needle that may be employed within the choke valve assembly of FIG. 1.

FIG. 6 is a cross-sectional view of another embodiment of a needle 156 that may be employed within the choke valve assembly of FIG. 1. In the illustrated embodiment, the needle 156 includes a base portion 158 and a tip portion 160. The base portion 158 includes a mounting portion 162 configured to couple to the shaft (e.g., by a threaded connection, a mechanical connection, a press-fit connection, a shrink-fit connection, a brazed connection, an adhesive connection, etc.). In addition, the tip portion 160 of the needle 156 is coupled to the base portion 158 of the needle 156 by a brazed/adhesive connection, as discussed in detail below. In the illustrated embodiment, the base portion 158 is formed from a non-superhard material (e.g., steel, stainless steel, a nickel alloy, etc.), and the tip portion 160 is formed from a superhard material (e.g., diamond, etc.). Furthermore, in the illustrated embodiment, a tip 164 of the needle 156 is formed by the tip portion 160. Forming the tip portion 160 from superhard material may substantially increase the longevity of the needle 156 (e.g., as compared to a needle in which the tip portion is formed from a non-superhard material). For example, a significant amount of abrasive material (e.g., sand, particles, etc.) may be entrained within the fluid flowing through the choke valve assembly (e.g., while the choke valve assembly is in the open state). The abrasive material may flow through the orifice, which is formed by the tip portion 160 of the needle 156 and a respective seat, at a substantial speed. However, because the tip portion 160 of the needle 156 is formed from superhard material, wear/abrasion of the tip portion 160 may be substantially reduced (e.g., as compared to a needle having a tip portion formed from a non-superhard material), thereby increasing the longevity of the needle.

As illustrated, the tip portion 160 is coupled to the base portion 158 by a brazed/adhesive connection 166. In the illustrated embodiment, the brazed/adhesive connection 166 includes a first layer of brazing material 168, a shim 170, a second layer of brazing material 172, an insert 174, and a layer of adhesive material 176. The insert 174 is positioned between the tip portion 160 and the base portion 158, and the shim 170 is positioned between the insert 174 and the base portion 158. In addition, the first layer of brazing material 168 is disposed between the base portion 158 and the shim 170, the second layer of brazing material 172 is disposed between the shim 170 and the insert 174, and the adhesive layer 176 is disposed between the insert 174 and the tip portion 160. The layers of brazing material are configured to couple the insert to the shim and to couple the shim to the base portion, and the adhesive layer is configured to couple the insert to the tip portion, thereby coupling the tip portion 160 of the needle 156 to the base portion 158 of the needle 156.

In certain embodiments, the base portion 158 is formed from non-superhard material (steel, stainless steel, a nickel alloy, etc.), and as previously discussed, the tip portion 160 is formed from superhard material, such as diamond (e.g., polycrystalline diamond). Accordingly, the coefficient of thermal expansion of the base portion 158 may be significantly greater than the coefficient of thermal expansion of the tip portion 160. In addition, while higher temperature fluid is flowing through the choke valve assembly, the needle may be heated to a significant temperature (e.g., about 300° C. to about 800° C., about 400° C. to about 700° C., or about 600° C.). As a result, the base portion 158 may expand significantly more than the tip portion 160. The elements/layers of the brazed/adhesive connection 166 are configured to accommodate the difference in thermal expansion between the tip portion and the base portion to maintain the coupling between the portions at higher temperatures (e.g., above 300° C., above 500° C., above 600° C., above 700° C., or above 800° C.).

In certain embodiments, the insert 174 may be formed from tungsten carbide, which has a coefficient of thermal expansion between the coefficient of thermal expansion of the non-superhard material (e.g., steel, stainless steel, a nickel alloy, etc.) of the base portion 158 and the coefficient of thermal expansion of the superhard material (e.g., diamond) of the tip portion 160. As a result, the difference in thermal expansion between the base portion and the insert may be less than the difference in thermal expansion between the base portion and the tip portion, and the difference in thermal expansion between the insert and the tip portion may be less than the difference in thermal expansion between the base portion and the tip portion. While an insert formed from tungsten carbide is disclosed above, in certain embodiments, the insert may be formed from another suitable non-superhard material having a coefficient of thermal expansion between the coefficient of thermal expansion of the base material and the coefficient of thermal expansion of the tip portion material. In addition, the shim may be formed from a relatively ductile/malleable material to accommodate the difference in thermal expansion between the base portion and the insert. For example, the shim may be formed from copper, an alloy including copper, nickel, or an alloy including nickel.

Furthermore, the brazing layers may be formed from any suitable type of brazing material(s) (e.g., suitable for the temperature range, suitable for the types of materials, etc.), such as brazing material(s) including at least one percent titanium (e.g., TICUSIL® active brazing alloy and/or INCUSIL®-ABA™ active brazing alloy by Morgan Advanced Materials of Hayward, CA, and/or APA 4 active brazing alloy, APA 7 active brazing alloy, APA 8 active brazing alloy, APA 9 active brazing alloy, or a combination thereof, by Prince & Izant Company of Cleveland, OH). In certain embodiments, the layers of brazing material may be activated concurrently. For example, one or more pieces of brazing foil may be disposed between the base portion 158 and the shim 170 to form the first layer of brazing material 168, and one or more pieces of brazing foil may be disposed between the shim 170 and the insert 174 to form the second layer of brazing material 172. The needle may then be heated to activate the pieces of brazing foil (e.g., to at least partially melt the pieces of brazing foil). As the brazing material cools and solidifies, the first layer of brazing material 168 forms a bond between the base portion 158 and the shim 170, and the second layer of brazing material 172 forms a bond between the shim 170 and the insert 174, thereby establishing a brazed connection between the base portion 158 and the insert 174. In certain embodiments, the heating and cooling process may be performed while the base portion, the shim, and the insert are under a compressive load along the longitudinal axis 96. For example, the base portion, the shim, and the insert may be disposed within a mold cavity for the heating and cooling process. While forming the layers of brazing material from brazing foil is disclosed above, in certain embodiments, at least one layer of brazing material may be formed by another suitable process/technique, such as applying the brazing material in a liquid/molten state.

Once the brazed connection is established, the adhesive layer 176 may be disposed between the insert 174 and the tip portion 160. The adhesive layer may include any suitable type(s) of adhesive(s) (e.g., suitable for the materials of the insert and the tip portion, suitable for the expected operating temperatures, etc.), such as an epoxy resin. The adhesive layer may be cured/hardened at ambient temperature and pressure, or the adhesive layer may be cured/hardened via a heating process (e.g., at an increased pressure).

The thickness of each element of the brazed/adhesive connection 166 may be selected (e.g., based on the material of the element) to accommodate the difference in thermal expansion between the tip portion and the base portion and to facilitate the coupling between the portions. For example, in certain embodiments, the insert may have a thickness of about 0.05 in. (e.g., 0.127 cm) to about 1 in. (e.g., 2.54 cm), about 0.1 in. (e.g., 0.254 cm) to about 0.5 in. (e.g., 1.27 cm), about 0.2 in. (e.g., 0.508 cm) to about 0.4 in. (e.g., 1.016 cm), or about 0.3 in. (e.g., 0.762 cm). Furthermore, in certain embodiments, the shim may have a thickness of about 1 mil (e.g., 0.0254 mm) to about 10 mil (e.g., 0.254 mm), about 2 mil (e.g., 0.0508 mm) to about 8 mil (e.g., 0.2032 mm), or about 2 mil (e.g., 0.0508 mm) to about 6 mil (e.g., 0.1524 mm).

While the brazed/adhesive connection 166 includes a single shim in the illustrated embodiment, in certain embodiments, the brazed/adhesive connection may have more or fewer shims. For example, in certain embodiments, a thickness and deformability of the brazing material may be sufficient to accommodate the difference in thermal expansion between the insert and the base portion. In such embodiments, the shim may be omitted. In addition, in certain embodiments, a shim may be disposed between the insert and the tip portion, a first adhesive layer may be disposed between the shim and the insert, and a second adhesive layer may be disposed between the shim and the tip portion. Furthermore, in certain embodiments, multiple shims may be disposed between the insert and the base portion and/or between the insert and the tip portion. In addition, while the brazed/adhesive connection 166 includes a single insert in the illustrated embodiment, in other embodiments, the brazed/adhesive connection may include additional inserts (e.g., 1, 2, 3, 4, or more). In such embodiments, layer(s) of brazing material and, in certain embodiments, shim(s) may be disposed between certain opposing inserts, and/or adhesive and, in certain embodiments, shim(s) may be disposed between other opposing inserts.

In the illustrated embodiment, the needle 156 includes an alignment pin 178 extending through the layers/elements of the brazed/adhesive connection 166, into a cavity 180 of the base portion 158, and into a cavity 182 of the tip portion 160. The alignment pin 178 is configured to align the base portion 158, the tip portion 160, and the elements of the brazed/adhesive connection 166 (e.g., the shim 170 and the insert 174) during the brazing/adhesive application process and during operation of the choke valve assembly. The alignment pin may be formed from any suitable material (e.g., suitable for the materials of the needle, suitable for the expected operating temperatures, etc.), such as invar (e.g., an alloy including about 36 percent nickel and about 64 percent iron) which has a low coefficient of thermal expansion. While the needle includes a single alignment pin for the base portion and the tip portion in the illustrated embodiment, in other embodiments, the needle may include more or fewer alignment pins (e.g., 0, 2, 3, 4, or more) for the base portion and the tip portion. For example, in certain embodiments, the alignment pin may be omitted. In such embodiments, the base portion may include a protrusion that extends through the layers/components of the brazed/adhesive connection and into a cavity of the tip portion, and/or the tip portion may include a protrusion that extends through the layers/components of the brazed/adhesive connection and into a cavity of the base portion.

While the surface of the base portion and the surface of the tip portion that interface with the brazed/adhesive connection are substantially flat in the illustrated embodiment, in certain embodiments, at least one portion may include a protrusion that interfaces with a cavity of the other portion. For example, in certain embodiments, the tip portion may include a protrusion that engages a cavity of the base portion. In such embodiments, the elements of the brazed/adhesive connection (e.g., the insert and the shim) may be disposed about the protrusion/cavity between the interfacing surfaces of the tip portion and the base portion. Furthermore, in certain embodiments, the tip portion and the base portion may be coupled to one another by additional suitable connection(s) (e.g., in combination with the brazed/adhesive connection), such as a fastener connection, a mechanical connection, a threaded connection, a press-fit connection, a shrink-fit connection, other suitable type(s) of connection(s), or a combination thereof. For example, the protrusion and the cavity disclosed above may be threaded to establish a threaded connection between the base portion and the tip portion.

In the illustrated embodiment, the tip portion 160 includes a first element 184, which forms the tip 164, and a second element 186. In the illustrated embodiment, the first element 184 and the second element 186 are formed from (e.g., formed entirely from) superhard material (e.g., diamond). However, in other embodiments, the first element may be formed from non-superhard material (e.g., tungsten carbide, etc.), and/or the second element may be formed from non-superhard material (e.g., tungsten carbide, etc.). In the illustrated embodiment, the first element 184 and the second element 186 of the tip portion 160 are coupled to one another by an adhesive connection 188. The adhesive of the adhesive connection may include any suitable type(s) of adhesive(s) (e.g., suitable for the material(s) of the tip portion, suitable for the expected operating temperatures, etc.), such as an epoxy resin. While the first and second elements are coupled to one another by an adhesive connection in the illustrated embodiment, in certain embodiments, the first and second elements may be coupled to one another by other suitable connection(s) (e.g., alone or in combination with the adhesive connection), such as a brazed connection, a fastener connection, other suitable type(s) of connection(s), or a combination thereof. Furthermore, in certain embodiments, the needle may include alignment pin(s) and/or other suitable alignment feature(s) (e.g., protrusion/cavity, etc.), such as the alignment pin/other suitable alignment features disclosed above with reference to alignment of the first and second elements of the tip portion of the needle of FIG. 5.

While the brazed connection is established between the insert and the base portion, and the adhesive connection is established between the insert and the tip portion in the illustrated embodiment, in certain embodiments, an adhesive connection may be established between the insert and the base portion, and a brazed connection may be established between the insert and the tip portion. In addition, while the tip portion 160 includes two elements in the illustrated embodiment, in other embodiments, the tip portion may include more or fewer elements (e.g., arranged along a direction of movement of the needle), such as 1, 3, 4, 5, 6, or more. Furthermore, while the base portion of the needle is formed from non-superhard material in the illustrated embodiment, in other embodiments, the base portion may be formed from superhard material. In certain embodiments, the base portion may be formed from a non-superhard material (e.g., invar) having a coefficient of thermal expansion similar to the superhard material of the tip portion (e.g., diamond). In such embodiments, the base portion may be coupled to the tip portion with a single layer of adhesive or a single layer of brazing material. Furthermore, while the tip portion of the needle is formed in the shape of a shear-cutter in the illustrated embodiment, in other embodiments, the tip portion of the needle may have any other suitable shape (e.g., a substantially conical shape, as previously discussed). In addition, with regard to the embodiments of the needles disclosed above with reference to FIGS. 3, 5, 6, any of the connections between the tip portion and the base portion may be used to couple the tip portion directly to the shaft (e.g., the base portion may be omitted). Furthermore, with regard to the embodiments of the needle disclosed above with reference to FIG. 4, the shell may be coupled directly to the shaft using the disclosed techniques/structures (e.g., the core may be omitted).

Figure 7:
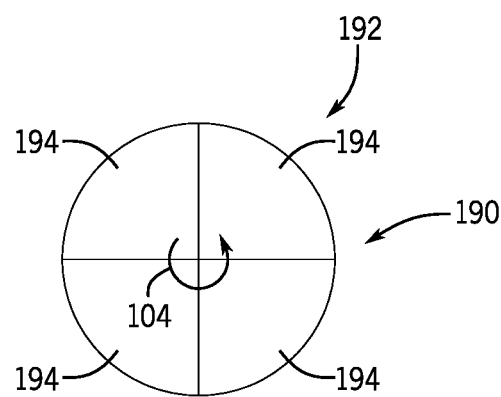
FIG. 7 is a top view of an embodiment of a tip portion of a needle that may be employed within the choke valve assembly of FIG. 1.

FIG. 7 is a top view of an embodiment of a tip portion 190 of a needle 192 that may be employed within the choke valve assembly of FIG. 1. In the illustrated embodiment, the tip portion 190 of the needle 192 is formed from diamond (e.g., polycrystalline diamond). Furthermore, in the illustrated embodiment, the tip portion 190 of the needle 192 is formed from multiple circumferential elements 194 that are coupled to one another along radial interfaces. As illustrated, the circumferential elements 194 are distributed about the circumferential axis 104 of the needle 192. In certain embodiments, each circumferential element 194 may be formed by an HPHT sintering process in which a cylindrical diamond (e.g., polycrystalline diamond) element is formed. The cylindrical diamond element may then be shaped into the circumferential element 194 by a machining process, by a laser ablation process, by an EDM/EGR process, by other suitable process(es), or a combination thereof. Once the circumferential elements 194 are formed, the circumferential elements 194 may be coupled to one another along the radial interfaces (e.g., via brazed connection(s), via adhesive connection(s), via mechanical connection(s), via other suitable connection(s), or a combination thereof).

While the tip portion 190 of the needle 192 has four circumferential elements 194 in the illustrated embodiment, in other embodiments, the tip portion may have more or fewer circumferential elements (e.g., 2, 3, 5, 6, 7, 8, or more). For example, the number of circumferential elements may be selected to establish a shape of the circumferential elements that is close to the shape of the respective cylindrical diamond elements to reduce waste and to reduce the time associated with the shaping process. Furthermore, while each circumferential element 194 has the same shape in the illustrated embodiment, in other embodiments, at least one circumferential element may have a different shape than at least one other circumferential element. In addition, while HPHT sintering to form a cylinder and subsequent shaping are disclosed above, in certain embodiments, at least one circumferential element may be formed by other suitable process(es) (e.g., pre-HPHT pressing, HPHT shaping, a CVD process, etc.). Furthermore, while the radial interfaces between the circumferential elements are substantially linear in the illustrated embodiment, in other embodiments, at least one radial interface may have another suitable shape (e.g., forming a mechanical interlock between circumferential elements). In addition, while each circumferential element is formed from diamond (e.g., polycrystalline diamond) in the illustrated embodiment, in other embodiments, at least one circumferential element may be formed from another suitable (e.g., superhard) material. Furthermore, in certain embodiments, the tip portion of the needle may have multiple longitudinal elements, such as the first and second elements disclosed above with reference to FIGS. 5 and 6. In such embodiments, at least one of the longitudinal elements may be formed from multiple circumferential elements as disclosed above.

Any of the elements formed from superhard material disclosed above with reference to FIGS. 3-6 may be formed from multiple circumferential elements as disclosed above. For example, the seat engaging element, the tip element, the spacer, or a combination thereof, of the tip portion of the needle of FIG. 3 may be formed from multiple circumferential elements. In addition, the shell or at least one portion of the shell of the needle of FIG. 4 may be formed from multiple circumferential elements. Furthermore, the tip portion or at least one element of the tip portion of the needle of FIG. 5 may be formed from multiple circumferential elements. In addition, the tip portion or at least one element of the tip portion of the needle of FIG. 6 may be formed from multiple circumferential elements.

Figure 8:
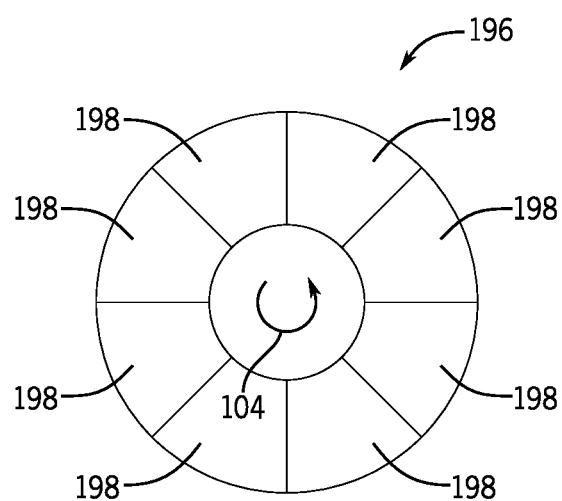
FIG. 8 is a top view of an embodiment of a seat that may be employed within the choke valve assembly of FIG. 1.

FIG. 8 is a top view of an embodiment of a seat 196 that may be employed within the choke valve assembly of FIG. 1. In the illustrated embodiment, the seat 196 is formed from diamond (e.g., polycrystalline diamond). Furthermore, in the illustrated embodiment, the seat 196 is formed from multiple circumferential elements 198 that are coupled to one another along radial interfaces. As illustrated, the circumferential elements 198 are distributed about the circumferential axis 104 of the seat 196. In certain embodiments, each circumferential element 198 may be formed by an HPHT sintering process in which a cylindrical diamond (e.g., polycrystalline diamond) element is formed. The cylindrical diamond element may then be shaped into the circumferential element 198 by a machining process, by a laser ablation process, by an EDM/EGR process, by other suitable process(es), or a combination thereof. Once the circumferential elements 198 are formed, the circumferential elements 198 may be coupled to one another along the radial interfaces (e.g., via brazed connection(s), via adhesive connection(s), via mechanical connection(s), via other suitable connection(s), or a combination thereof).

While the seat 196 has eight circumferential elements 198 in the illustrated embodiment, in other embodiments, the seat may have more or fewer circumferential elements (e.g., 2, 3, 4, 5, 6, 7, 9, 10, or more). For example, the number of circumferential elements may be selected to establish a shape of the circumferential elements that is close to the shape of the respective cylindrical diamond elements to reduce waste and to reduce the time associated with the shaping process. Furthermore, while each circumferential element 198 has the same shape in the illustrated embodiment, in other embodiments, at least one circumferential element may have a different shape than at least one other circumferential element. In addition, while HPHT sintering to form a cylinder and subsequent shaping are disclosed above, in certain embodiments, at least one circumferential element may be formed by other suitable process(es) (e.g., pre-HPHT pressing, HPHT shaping, a CVD process, etc.). Furthermore, while the radial interfaces between the circumferential elements are substantially linear in the illustrated embodiment, in other embodiments, at least one radial interface may have another suitable shape. In addition, while each circumferential element is formed from diamond (e.g., polycrystalline diamond) in the illustrated embodiment, in other embodiments, at least one circumferential element may be formed from another suitable (e.g., superhard) material. Furthermore, in certain embodiments, the seat may have multiple longitudinal elements. In such embodiments, at least one of the longitudinal elements may be formed from multiple circumferential elements as disclosed above. In addition, while a right angle choke valve assembly is disclosed herein, any of the embodiments of the needle and the seat disclosed above may be employed within an inline choke valve assembly.

Technical effects of the disclosure include increasing the longevity of choke valve assemblies and enabling the choke valve assembly to control the flow of higher-temperature fluid. For example, in certain embodiments, the choke valve assembly includes a needle having a base portion formed from a first non-superhard material and a tip portion formed from a superhard material. The needle also includes a brazed connection coupling the tip portion to the base portion. The brazed connection includes an insert formed from a second non-superhard material, in which the second non-superhard material is harder than the first non-superhard material and softer than the superhard material. The brazed connection also includes a shim disposed between the insert and the base portion, a first layer of brazing material disposed between the base portion and the shim, and a second layer of brazing material disposed between the shim and the insert. Due to the configuration of the brazed connection, the brazed connection may accommodate a difference in thermal expansion between the tip portion and the base portion, thereby maintaining the coupling between the tip portion and the base portion at higher temperatures. In addition, because the tip portion is formed from superhard material, the longevity of the needle may be increased.

While only certain features have been illustrated and described herein, many modifications and changes will occur to those skilled in the art. It is, therefore, to be understood that the appended claims are intended to cover all such modifications and changes as fall within the true spirit of the disclosure.

Additionally, it should be understood that references to "one embodiment" or "an embodiment" or "certain embodiments" of the present disclosure are not intended to be interpreted as excluding the existence of additional embodiments that also incorporate the recited features. For example, any element or feature described in relation to an embodiment herein may be combinable with any element or feature of any other embodiment described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted in accordance with functional claiming constructions, including under 35 U.S.C. § 112(f) as applicable. However, for any claims containing elements designated in any other manner, it is intended that such elements are not to be interpreted using functional claiming constructions.

What is claimed is:

1. A needle for a choke valve assembly, comprising:
   a tip portion, comprising:
      a retainer comprising a threaded shaft;
      a seat-engaging element configured to engage a seat of the choke valve assembly while the choke valve assembly is in a closed state, wherein the seat-engaging element is engaged with the retainer such that the threaded shaft of the retainer extends through a central passage of the seat-engaging element; and
      a nut engaged with the threaded shaft to block movement of the seat-engaging element along the threaded shaft; and
   a base portion having a threaded recess, wherein the threaded shaft is engaged with the threaded recess to couple the tip portion to the base portion, and the nut is positioned between the threaded recess of the base portion and an entirety of the central passage of the seat-engaging element.

2. The needle of claim 1, wherein the retainer comprises an engagement portion configured to contact a shoulder of the seat-engaging element to block movement of the seat-engaging element away from the nut along the threaded shaft.

3. The needle of claim 1, comprising a spacer disposed on the threaded shaft between the seat-engaging element and the base portion.

4. The needle of claim 1, wherein the seat-engaging element is formed from superhard material.

5. The needle of claim 1, comprising a tip element coupled to the retainer, wherein the tip element forms a tip of the needle.

6. The needle of claim 1, wherein the retainer comprises an engagement feature configured to facilitate rotation of the threaded shaft, to facilitate blocking rotation of the threaded shaft, or a combination thereof.

7. A needle for a choke valve assembly, comprising:
   a tip portion, comprising:
      a retainer comprising a threaded shaft;
      a seat-engaging element configured to engage a seat of the choke valve assembly while the choke valve assembly is in a closed state, wherein the seat-engaging element is engaged with the retainer such that the threaded shaft of the retainer extends through a central passage of the seat-engaging element; and a nut engaged with the threaded shaft to block movement of the seat-engaging element along the threaded shaft; and a base portion having a threaded recess, wherein the threaded shaft is engaged with the threaded recess to couple the tip portion to the base portion, the nut is positioned on the same side of the seat-engaging element as the base portion, and the nut is positioned between the threaded recess of the base portion and an entirety of the central passage of the seat-engaging element.

8. The needle of claim 7, wherein the retainer comprises an engagement portion configured to contact a shoulder of the seat-engaging element to block movement of the seat-engaging element away from the nut along the threaded shaft.

9. The needle of claim 7, comprising a spacer disposed on the threaded shaft between the seat-engaging element and the base portion.

10. The needle of claim 7, wherein the seat-engaging element is formed from superhard material.

11. The needle of claim 7, comprising a tip element coupled to the retainer, wherein the tip element forms a tip of the needle.

12. The needle of claim 7, wherein the retainer comprises an engagement feature configured to facilitate rotation of the threaded shaft, to facilitate blocking rotation of the threaded shaft, or a combination thereof.

\* \* \* \* \*